United States Patent
Schulte et al.

(10) Patent No.: US 12,487,183 B2
(45) Date of Patent: Dec. 2, 2025

(54) METHOD FOR ANALYZING AN ELECTRODE LAYER OF A BATTERY STORAGE DEVICE, METHOD FOR PRODUCING A BATTERY STORAGE DEVICE, AND PRODUCTION UNIT

(71) Applicant: Siemens Aktiengesellschaft, Munich (DE)

(72) Inventors: Sascha Schulte, Höchstadt (DE); Manfred Baldauf, Erlangen (DE); Alexander Michael Gigler, Untermeitingen (DE); Frank Steinbacher, Eckental (DE); Arno Arzberger, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 317 days.

(21) Appl. No.: 18/547,651

(22) PCT Filed: Feb. 1, 2022

(86) PCT No.: PCT/EP2022/052305
§ 371 (c)(1),
(2) Date: Aug. 23, 2023

(87) PCT Pub. No.: WO2022/179810
PCT Pub. Date: Sep. 1, 2022

(65) Prior Publication Data
US 2024/0303800 A1    Sep. 12, 2024

(30) Foreign Application Priority Data

Feb. 26, 2021 (EP) ..................................... 21159596
Mar. 16, 2021 (EP) ..................................... 21162908

(51) Int. Cl.
*G01N 21/01* (2006.01)
*G01N 21/84* (2006.01)
(Continued)

(52) U.S. Cl.
CPC ......... *G01N 21/8422* (2013.01); *G01N 21/01* (2013.01); *G01N 21/8806* (2013.01);
(Continued)

(58) Field of Classification Search
CPC ............... G01N 21/8422; G01N 21/01; G01N 21/8806; G01N 2021/0181;
(Continued)

(56) References Cited

U.S. PATENT DOCUMENTS 11,334,984 B2 * 5/2022 Han ........................ H01M 4/13
12,128,466 B2 * 10/2024 Terasawa ................ B21C 51/00
(Continued)

FOREIGN PATENT DOCUMENTS

CN 102435628 A * 5/2012
CN 112132229 A 12/2020 ............... G06K 9/62
(Continued)

OTHER PUBLICATIONS

Search Report for International Application No. PCT/EP2022/052305, 12 pages, May 10, 2022.
(Continued)

*Primary Examiner* — Sheela C Chawan
(74) *Attorney, Agent, or Firm* — Slayden Grubert Beard PLLC

(57) ABSTRACT

Various embodiments include a method for analyzing an electrode layer for a battery storage device in an electrode layer production facility. The method may include: acquiring an image comprising two pixels of the electrode layer, wherein a first pixel represents a first location of the electrode layer and a second pixel represents a second location
(Continued)

of the electrode layer, wherein the first location and the second location are disposed adjacent to each other; determining a first value for a material property of the electrode layer at the first location based on the first pixel; determining a second value for the material property of the electrode layer at the second location based on the second pixel; comparing the first value and the second value and determining a comparison value; and determining characteristic properties of the electrode layer based on the comparison value.

12 Claims, 2 Drawing Sheets

(51) Int. Cl.
    *G01N 21/88*     (2006.01)
    *G06T 7/00*     (2017.01)
    *G06V 10/764*     (2022.01)
    *H01M 4/139*     (2010.01)
    *G06V 10/143*     (2022.01)

(52) U.S. Cl.
    CPC .......... *G06T 7/0004* (2013.01); *G06V 10/764* (2022.01); *H01M 4/139* (2013.01); *G01N 2021/0181* (2013.01); *G01N 2021/8845* (2013.01); *G06T 2207/20081* (2013.01); *G06V 10/143* (2022.01)

(58) Field of Classification Search
    CPC ... G01N 2021/8845; G01N 2021/8918; G01N 21/31; G06T 7/0004; G06T 2207/20081; G06V 10/764; G06V 10/143; H01M 4/139; H01M 10/4285; Y02E 60/10
    USPC .................................................. 382/100, 141
    See application file for complete search history.

(56) References Cited

U.S. PATENT DOCUMENTS

| | | | |
|---|---|---|---|
| 2014/0327760 A1* | 11/2014 | Kurz ...................... | G01V 99/00 348/135 |
| 2017/0125853 A1 | 5/2017 | Song et al. ..................... | 702/63 |

FOREIGN PATENT DOCUMENTS

| | | | | |
|---|---|---|---|---|
| JP | 2003249212 A | | 9/2003 | ............ H01M 10/05 |
| JP | 2012164440 A | | 8/2012 | .............. H01M 4/21 |
| JP | 2015069868 A | | 4/2015 | ........... G01N 23/223 |
| JP | 2019102187 A | | 6/2019 | .......... H01M 10/058 |
| KR | 20200010932 A | * | 1/2020 | ........ G01R 31/3865 |
| WO | 2020/100561 A1 | | 5/2020 | ............. B21B 29/00 |
| WO | 2020/190366 A1 | | 9/2020 | ............. B29C 48/10 |

OTHER PUBLICATIONS

Gruber Florian et al., "Quality Control of Slot-Die Coated Aluminum Oxide Layers for Battery Applications Using Hyperspectral Imaging" J. Imaging 2016, 2(2), 12; https://doi.org/10.3390/jimaging2020012, Nov. 30, 2015.
Yann Lecun et al., "Deep Learning" Nature, Bd. 521, Nr. 7553.
Canadian Office Action, Application No. 3208845, 4 pages, Mar. 24, 2025.
Japanese Office Action, Application No. 2023549617, 10 pages, Dec. 17, 2024.
WO 2020/100561 A1, US 12128466 B2.

* cited by examiner

METHOD FOR ANALYZING AN ELECTRODE LAYER OF A BATTERY STORAGE DEVICE, METHOD FOR PRODUCING A BATTERY STORAGE DEVICE, AND PRODUCTION UNIT

CROSS-REFERENCE TO RELATED APPLICATIONS

This application is a U.S. National Stage Application of International Application No. PCT/EP2022/052305 filed Feb. 1, 2022, which designates the United States of America, and claims priority to EP Application No. 21162908.4 filed Mar. 16, 2021 and EP Application No. 21159596.2 filed Feb. 26, 2021, the contents of which are hereby incorporated by reference in their entirety.

TECHNICAL FIELD

The present disclosure relates to batteries. Various embodiments of the teachings herein include methods for analyzing an electrode layer of a battery storage device, methods for producing a battery storage device, production units, and/or computer program products.

BACKGROUND

Lithium-ion accumulators, hereinafter also referred to as lithium-ion batteries, are used as energy storage devices in mobile and stationary applications due to their high power and energy density. A lithium-ion battery typically comprises a plurality of battery cells. A battery cell, in particular a lithium-ion battery cell, comprises a plurality of layers. These layers typically comprise anodes, cathodes, separators, and other elements. These layers can be designed as stacks or as windings.

The electrodes typically comprise metal foils, in particular comprising copper and/or aluminum, which are coated with an active material. A lithium-containing paste, known as a slurry, is typically applied as the active material. The foils and the coating have a thickness of a few micrometers in each case. As a result, even a few micrometers of deviation in the thickness of the coating or in the material properties, in particular the material composition, will adversely affect the quality of the electrode. Therefore, irregular coating disadvantageously produces battery cells of inferior quality. A further disadvantage is that safe operation of the battery cell is not guaranteed.

In the current state of the art, defective coatings can often only be detected in a so-called end-of-line test after completion of the entire battery cell production process. In some cases, defective coatings are only detected after the battery cell has been in operation for a number of years. Battery production is therefore disadvantageously subject to a high reject rate. This means that the production process requires a high material and energy input in order to produce a sufficient quantity of high-quality battery cells.

SUMMARY

The teachings of the present disclosure include methods for analyzing the electrode layer, methods for producing a battery storage device, production units, and computer program products that reduce the reject rate of battery production. For example, some embodiments include a method for analyzing an electrode layer (4) for a battery storage device (50) in an electrode layer production facility (8), comprising: providing a hyperspectral camera (5) which captures pixels, acquiring an image comprising at least two pixels of the electrode layer (4), wherein a first pixel represents a first location of the electrode layer (4) and a second pixel represents a second location of the electrode layer (4), wherein the first location and the second location are disposed adjacent to each other, determining a first material property of the electrode layer (4) at the first location based on the first pixel, and determining a second material property of the electrode layer at the second location based on the second pixel in a computing unit (100), comparing the material property at the first location and the second location and determining a comparison value, and determining characteristic properties of the electrode layer (4) based on the comparison value.

In some embodiments, a layer thickness, a material composition gradient, a material homogeneity value and/or a moisture value of the electrode layer (4) and/or cracks in the electrode layer (4) are determined as a characteristic property.

In some embodiments, a first AI engine (111) is used for computer-aided determination of a material property.

In some embodiments, the first AI engine (111) is trained using deep learning methods to categorize the pixels into classes of material properties.

In some embodiments, the electrode layer (4) is inserted into a battery cell of the battery storage device (50), the battery storage device (50) is put into operation, operating data (103) of the battery storage device (50) is determined, this operating data (103) is used to determine a quality value of the battery storage device (50), wherein the quality value is correlated with the characteristic property.

In some embodiments, a second AI engine (112) is trained to categorize the quality value into quality classes and to perform an evaluation of the characteristic property based on these quality classes.

In some embodiments, an aging characteristic, a capacity and/or an internal resistance of the battery storage device (50) is used as the quality value.

In some embodiments, the image of the electrode layer (4) is captured during a production process of the battery storage device (50).

In some embodiments, the amount of solvent in the electrode layer paste is determined as the moisture value.

As another example, some embodiments include a method for producing a battery storage device (50), comprising: analyzing an electrode layer (4) for the battery storage device (50) according to one or more of the methods described herein, and adjusting at least one production condition for producing the electrode layer (4) based on at least one characteristic property and/or at least one quality value.

In some embodiments, at least one production condition for producing the electrode layer (4) is adjusted based on at least two characteristic properties and/or at least two quality values.

In some embodiments, temperatures, solvent content of an electrode slurry (2), the degree of mixing of the electrode slurry (2) and/or an application speed of the electrode slurry (2) onto a carrier substrate (3) are adjusted as production conditions.

As another example, some embodiments include a production unit (1) for producing a battery storage device (50), comprising: an electrode layer production facility (8) comprising a hyperspectral camera (5), and a computing unit (100) designed to carry out one or more of the methods described herein.

As another example, some embodiments include a computer program product directly loadable into a memory of a programmable computing unit (100), comprising program code means for carrying out one or more of the methods described herein when the computer program product is executed in the computing unit (100).

BRIEF DESCRIPTION OF THE DRAWINGS

Further features, characteristics and advantages of the present teachings will emerge from the following description with reference to the accompanying schematic drawings in which.

DETAILED DESCRIPTION

Figure 1:
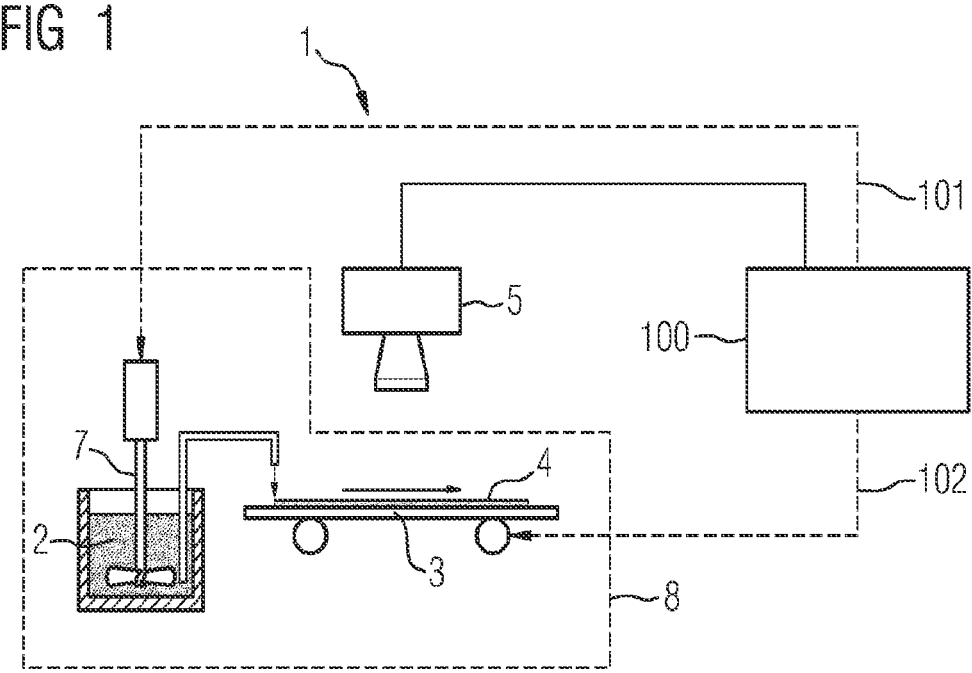
FIG. 1 shows a production unit comprising an electrode layer production facility with a hyperspectral camera and a computing unit incorporating teachings of the present disclosure.

Various example methods incorporating teachings of the present disclosure may include using a hyperspectral camera. The hyperspectral camera captures image pixels. The hyperspectral camera acquires an image comprising at least two pixels of the electrode layer. A first pixel represents a first location of the electrode layer and a second pixel represents a second location of the electrode layer. The first location and the second location are disposed adjacent to each other. Based on the first pixel, a first material property of the electrode layer at the first location is determined. Based on the second pixel, a second material property of the electrode layer at the second location is determined. Both determinations are performed in a computing unit. The material property at the first location is then compared with that at the second location. Based on the comparison, a comparison value is determined. Based on the comparison value, a characteristic property of the electrode layer is then determined.

Various embodiments of the teachings herein include a method for producing a battery storage device. For example, an electrode layer for the battery storage device is analyzed. Then, at least one production condition for producing the electrode layer is then adjusted based on at least one characteristic property and/or at least one quality value.

An example production unit for producing a battery storage device comprises an electrode layer production facility having a hyperspectral camera and a computing unit. The computing unit is designed to carry out one or more of the methods described herein.

As another example, some embodiments include a computer program product directly loadable into a memory of a programmable computing unit and comprising program code means for executing one or more of the methods described herein.

In this disclosure, directly adjacent pixels are regarded as adjacently disposed pixels. Pixels whose distance apart is so small that it is possible to interpolate the material property between the pixels are also deemed to be adjacently disposed. In particular, the pixels can be 2 cm apart, or 1 cm apart.

In some embodiments, the material property is determined on the basis of the reflection behavior of the electrode layer at a selected wavelength. In some embodiments, the material property is determined via a prior calibration of the pixels of the hyperspectral camera.

The material property of the electrode layer is therefore analyzed based on the images of the hyperspectral camera. The use of the hyperspectral camera allows different wavelengths to be analyzed and used in a suitable superposition to create a characteristic image of the material property. In contrast to conventional grayscale or three-channel imaging, the spectral differences are not evaluated collectively as a color property, but rather the different wavelengths, each evaluated separately, contribute to an image segmentation and/or analysis of the material property. The method is based on the fact that, because of their chemical compositions, different materials exhibit different properties in different wavelengths. With the methods described herein, it is thus possible to determine a material property without changing or even destroying the electrode layer. The use of the hyperspectral camera also enables the electrode layer to be analyzed continuously, and not just on a random basis. This allows a much more precise analysis of the electrode layer. The production conditions in the production method can therefore be varied with greater accuracy based on more precise data.

In addition, it is possible to determine a characteristic property on the basis of the comparison value. In particular, a layer thickness, material composition gradient, material homogeneity value and/or moisture value are determined as a characteristic property. Likewise, irregularities in the topology of the electrode layer, particularly cracks or holes, can be detected. In particular, it is thus possible to determine irregularities that occur during production. The characteristic property can be evaluated in particular on the basis of a comparison with reference values. If the characteristic property exceeds limit values of the reference values, the production conditions can be adjusted.

In some embodiments, the hyperspectral camera makes it possible to measure continuously over time. Accordingly, it is possible to determine a change in a material property as a local material property gradient and/or as a temporal material property gradient. It is thus possible to detect changes during electrode layer production at an early stage.

In some embodiments, a first AI engine is used for determining a material property. The method is thus carried out in a computer-aided manner. Evaluation of the pixels of the hyperspectral camera may therefore be automated. Thus, human intervention is no longer necessary. This makes it possible to process very large amounts of data. In addition, it is possible to perform an evaluation very quickly.

In some embodiments, the first AI engine is trained by means of deep learning methods to categorize the pixels into classes of material properties. The evaluation of the image data of the hyperspectral camera is therefore automated. Thus, human intervention is no longer necessary. This makes it possible to process very large volumes of data. In addition, it is possible to perform an evaluation very quickly.

In some embodiments, the electrode layer is inserted into the battery storage device, the battery storage device is put into operation, and operating data of the battery storage device is determined. This operating data is used to determine a quality value of the battery storage device, wherein the quality value is correlated with the characteristic property. Thus, to train a second AI engine, electrode layers are installed in a battery storage device and the battery storage device is operated. The operating data is then correlated with the characteristic properties. Based on the operating data and the characteristic property, a correlation with a quality value can then be determined. In particular, an aging characteristic, capacity, and/or internal resistance of the battery storage device is used as a quality value.

If the second AI engine has been trained with this data, it is now possible to determine a quality value by means of the second AI engine just on the basis of the characteristic property, without having to put that battery cell into operation. It can therefore be decided at an early stage whether this electrode layer is to be installed in a battery cell or whether this electrode layer in the battery cell is to be installed in a larger energy storage device. Thus, the reject rate is reduced by an analysis that has already taken place during electrode layer production. This results in significantly increased efficiency of the production process.

In some embodiments, the second AI engine is trained to categorize the quality value into quality classes and to perform an evaluation of the characteristic property based on these quality classes. Categorizing the quality values into classes and assigning the quality values to the characteristic property speeds up the evaluation process and makes it more robust. Thus the proportion of rejects from battery production can be reduced still further.

In some embodiments, the image of the electrode layer is captured during a production process of the battery storage device. In some embodiments, the electrode layer can thus be analyzed virtually in real time during production. In addition, the electrode layer can be evaluated very quickly and reliably by means of the characteristic property. Thus, an electrode layer can be advantageously evaluated without it first having to be put into operation. The reject rate for entire battery cells can be reduced.

In some embodiments, the amount of solvent in the electrode layer is determined as the moisture value. If the moisture value in the electrode layer is negatively correlated with the quality value or if the characteristic property deteriorates beyond a predetermined limit range, the electrode layer slurry can be adjusted such that the electrode layer reliably exhibits the desired properties.

In some embodiments, at least one production condition is adjusted on at least two quality values in at least two different quality classes. In other words, the adjustment takes place only when the quality is deficient in two quality aspects, in particular moisture value and cracking. This prevents the production conditions from being adjusted disproportionately. The adjustment is therefore more robust.

In some embodiments, temperatures, solvent content in the electrode layer slurry and/or the degree of mixing of the electrode layer slurry are adjusted as production conditions such that the characteristic property and the quality value assigned to it advantageously increase. In addition, the application rate of the electrode slurry (paste) can be varied. It can also be checked whether nozzles, which ensure that the electrode slurry flows onto a substrate, are clogged (in particular, if the layer thickness constantly deviates from a setpoint value in a longitudinally running path of the electrode layer). The degree of mixing is varied in particular by the stirring speed and the type of mixer. In addition, measures can be taken to prevent undesirable vibration of a supporting substrate of the electrode layer.

FIG. 1 shows a production unit 1 incorporating teachings of the present disclosure. The production unit 1 comprises an electrode layer production facility 8, a hyperspectral camera 5, and a computing unit 100. The electrode layer production facility 8 comprises a supporting substrate 3 onto which an electrode layer 4 of electrode slurry 2 is applied. The electrode slurry 2 is homogenized in a vessel by means of a mixer 7.

The hyperspectral camera 5 captures an image comprising at least two pixels of the electrode layer 4. The two pixels are at locations adjacent to each other. Based on the pixels, a material property of the electrode layer can be determined in the computing unit 100. In this example, based on the image data, the material composition is evaluated as a material property. The material compositions determined at the two adjacent locations are combined to form a comparison value. This comparison value can in particular be a concentration gradient of a defined material composition and/or a concentration gradient of a defined component of the electrode slurry 2. Based on this comparison value, a characteristic property can then be determined. In this example, a characteristic property is a material composition gradient. Based on this material composition gradient, in particular a material homogeneity value can also be determined.

It is now possible to compare the material composition gradient and/or the material homogeneity value with reference values. If these characteristic properties deviate from a defined limit value, in particular the speed of the mixer 7 and/or the running speed of the substrate 3 can be adjusted.

Figure 2:
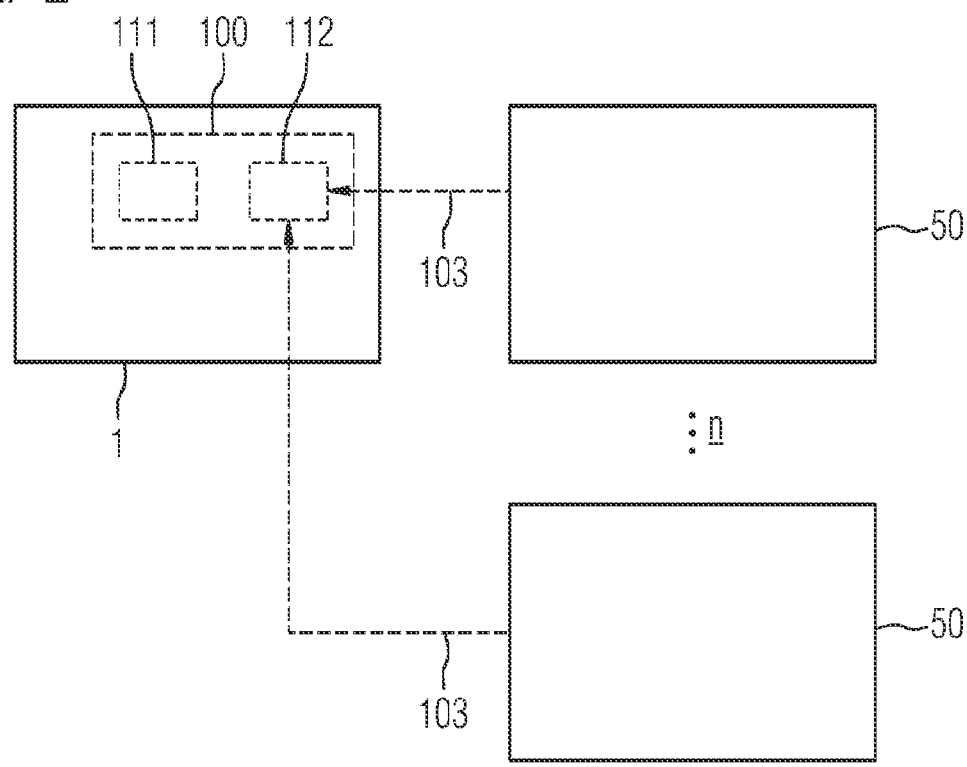
FIG. 2 shows an electrode layer production facility and two battery cells incorporating teachings of the present disclosure.

In some embodiments, as shown in FIG. 2, the computing unit 100 includes an AI engine. This AI engine can be trained using operating data from battery storage devices 50 comprising battery cells into which the electrode layers have been inserted. Based on the operating data, a quality value can be determined, the AI engine being trained to correlate the quality value with the characteristic property.

Thus, by using the trained AI engine, it is possible to determine a quality value based on the characteristic property analyzed using the hyperspectral camera and the captured image. Based on this quality value, production conditions of the production unit 1 can now be adjusted, as already shown in the first exemplary embodiment. In this example, the mixer 7 of the electrode slurry 2 is adjusted by means of a second control signal 102 and/or the running speed of the electrode substrate 3 is adjusted by means of a first control signal 101.

In addition, it is possible to determine material composition gradients and/or layer thicknesses by comparing the adjacent image captures. This evaluation can be used to determine where defects such as cracks and/or inclusions in particular are present in the electrode layer.

Figure 3:
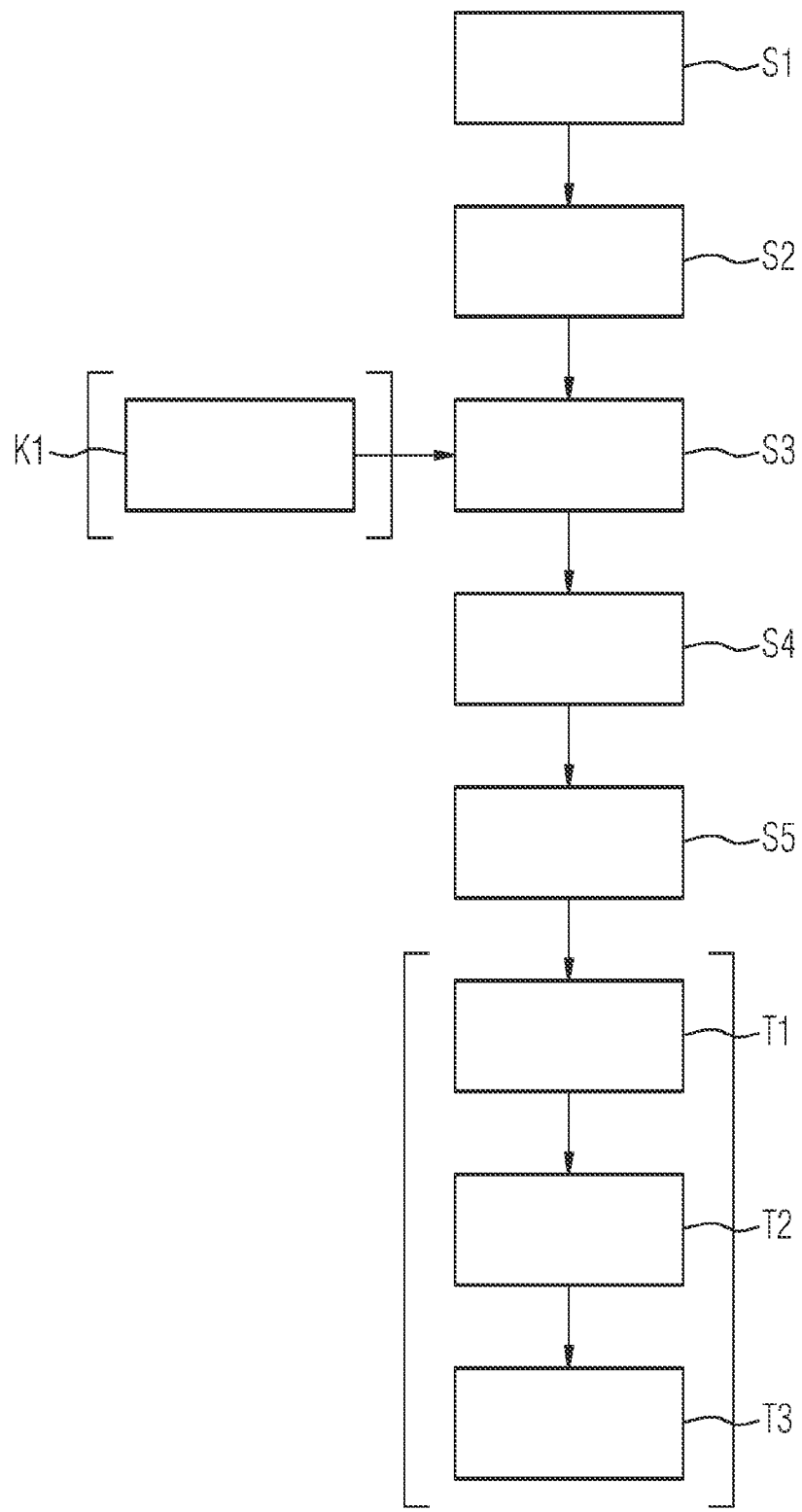
FIG. 3 shows a process diagram for analyzing an electrode layer for a battery storage device incorporating teachings of the present disclosure.

FIG. 3 schematically illustrates a method for analyzing an electrode layer incorporating teachings of the present disclosure. First, a hyperspectral camera is provided in a first step S1. Then, in a second step S2, an image with at least two pixels is captured by means of the hyperspectral camera. In a third step S3, a first material property at a first location and a second material property at a second location are determined. In a fourth step S4, the material property is compared. Based thereon, a comparison value is determined. Based on the comparison value, a characteristic property of the electrode layer is determined in a fifth step S5.

In an optional further method step T1, the electrode layer is inserted into a battery cell. In a further step T2, the battery cell is put into operation and operating data is determined. Based on the operating data, a quality value of the battery cell is determined and correlated with the characteristic property analyzed by means of the hyperspectral camera using an AI engine. The steps T1 to T3 can thus be regarded as training steps for an AI engine for evaluating a quality value.

In a further optional method step K1, another AI engine can be trained to categorize the pixels determined by the hyperspectral camera into classes of material properties.

LIST OF REFERENCE CHARACTERS 1 production unit
2 electrode slurry
3 supporting substrate
4 electrode layer
5 hyperspectral camera
7 mixer
8 electrode layer production facility
50 battery storage device
100 computing unit
101 first control signal
102 second control signal
103 operating data
111 first AI engine
112 second AI engine
S1 Providing a hyperspectral camera
S2 Acquiring an image with at least two pixels
S3 Determining a first material property and a second material property
S4 Comparing the material properties
S5 Determining a characteristic property of the electrode layer
T1 Inserting the electrode layer in a battery storage device
T2 Putting the battery storage into operation and determining operating data
T3 Determining a quality value and correlating it to the characteristic property
K1 Categorizing the pixels into classes of material property by means of a first AI engine

What is claimed is:

1. A method for analyzing an electrode layer for a battery storage device in an electrode layer production facility, the method comprising:
    acquiring an image comprising two pixels of the electrode layer using a hyperspectral camera, wherein a first pixel represents a first location of the electrode layer and a second pixel represents a second location of the electrode layer, wherein the first location and the second location are disposed adjacent to each other;
    determining a first value for a material property of the electrode layer at the first location based on the first pixel;
    determining a second value for the material property of the electrode layer at the second location based on the second pixel;
    comparing the first value and the second value and determining a comparison value; and
    determining characteristic properties of the electrode layer based on the comparison value.

2. The method as claimed in claim 1, wherein the characteristic property includes one of: a layer thickness, a material composition gradient, a material homogeneity value, a moisture value of the electrode layer and/or cracks in the electrode layer.

3. The method as claimed in claim 1, wherein a first AI engine determines the values for the material property.

4. The method as claimed in claim 3, wherein the first AI engine is trained using deep learning methods to categorize the pixels into classes of material properties.

5. The method as claimed in claim 1, further comprising:
    inserting the electrode layer into a battery cell of the battery storage device;
    putting the battery storage device into operation;
    determining operating data of the battery storage device; and
    using the operating data to determine a quality value of the battery storage device;
    wherein the quality value correlates with the characteristic property.

6. The method as claimed in claim 5, wherein a second AI engine is trained to categorize the quality value into quality classes and perform an evaluation of the characteristic property based on these quality classes.

7. The method as claimed in claim 5, wherein the quality value includes one of: an aging characteristic, a capacity and/or an internal resistance of the battery storage device.

8. The method as claimed in claim 1, further comprising capturing the image of the electrode layer during a production process of the battery storage device.

9. The method as claimed in claim 1, further comprising determining a moisture value based on an amount of solvent in the electrode layer paste.

10. A method for producing a battery storage device, the method comprising:
    acquiring an image comprising two pixels of the electrode layer using a hyperspectral camera, wherein a first pixel represents a first location of the electrode layer and a second pixel represents a second location of the electrode layer, wherein the first location and the second location are disposed adjacent to each other;
    determining a first value for a material property of the electrode layer at the first location based on the first pixel;
    determining a second value for the material property of the electrode layer at the second location based on the second pixel;
    comparing the first value and the second value and determining a comparison value;
    determining characteristic properties of the electrode layer based on the comparison value; and
    adjusting at least one production condition for producing the electrode layer based on the characteristic property and/or at least one quality value.

11. The production method as claimed in claim 10, further comprising adjusting at least one production condition for producing the electrode layer based on at least two characteristic properties and/or at least two quality values.

12. The production method as claimed in claim 10, wherein the production conditions include at least one of: temperatures, solvent content of an electrode slurry, a degree of mixing of the electrode slurry, and/or an application speed of the electrode slurry onto a carrier substrate.

* * * * *